Nov. 12, 1957  H. B. SMITH ET AL  2,813,241
CIRCUIT FOR PHASE SHIFT MEASUREMENT
Filed Oct. 28, 1954

WITNESSES:
E. A. McCloskey.
I. H. Murray

INVENTORS
Harry B. Smith
and Elberson D. Green.
BY
F. E. Browder
ATTORNEY

United States Patent Office 2,813,241
Patented Nov. 12, 1957

2,813,241

CIRCUIT FOR PHASE SHIFT MEASUREMENT

Harry B. Smith and Elberson D. Green, Baltimore, Md., assignors to Westinghouse Electric Corporation, East Pittsburgh, Pa., a corporation of Pennsylvania Application October 28, 1954, Serial No. 465,168

8 Claims. (Cl. 320—1)

This invention relates to a circuit which measures the phase shift of a pulsed signal and, more particularly, to a circuit of the type described which produces a pair of opposed-polarity control voltages in response to a phase shift of a pulsed signal.

It is an object of our invention to provide an electrical circuit for measuring the phase shift of a pulsed signal with respect to a pair of pulsed reference signals, said circuit being adapted for use in any installation where phase shift measurement is required.

Another object of our invention lies in the provision of a circuit which produces two opposed-polarity control voltages which vary as a function of the phase shift of a pulsed signal, said control voltages being such as to indicate the direction of phase shift by their relative polarities and the degree of phase shift by their magnitudes.

A still further object of the invention lies in the provision of a circuit of the type described above in which the opposed-polarity control voltages produced by the phase shift of a pulsed signal will remain constant in the absence of coincidence until a further phase shift occurs.

The above and other novel features of our invention are set forth with particularity in the appended claims. Our invention itself, however, both as to its organization and method of operation, together with further objects and advantages thereof, may best be understood by reference to the following description, taken in connection with the accompanying drawing which schematically illustrates one embodiment of our invention.

Figure 1:
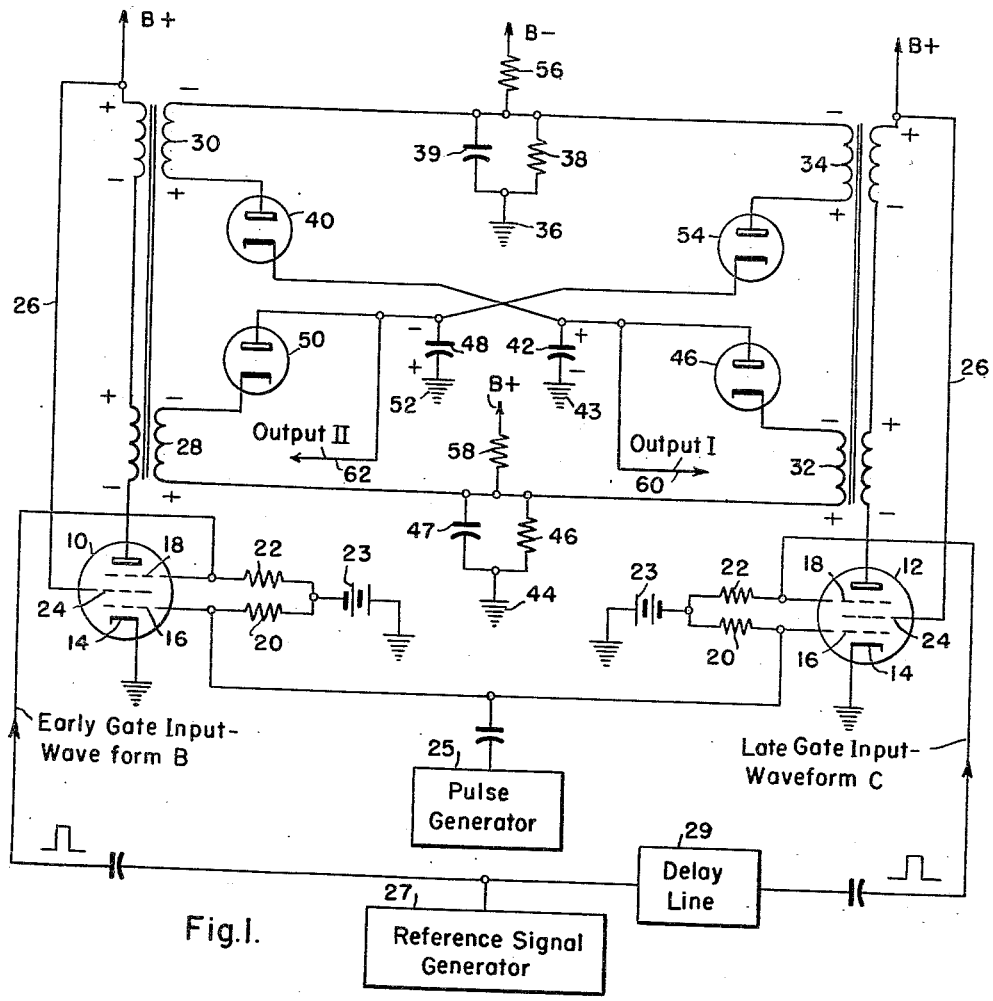
Fig. 1 is a schematic diagram of the invention.

Referring to the drawing, the circuit shown in Fig. 1 includes two pentode vacuum tubes 10 and 12 having their cathodes 14 connected directly to ground. The control grid 16 and suppressor grid 18 of each tube 10, 12 are connected through bias resistors 20 and 22, respectively, to a source of negative bias voltage 23. The screen grid 24 of each tube is connected via lead 26 to the positive side of an anode voltage source, not shown, thereby making the screen grid positive with respect to all other elements in the tube.

Figure 2:
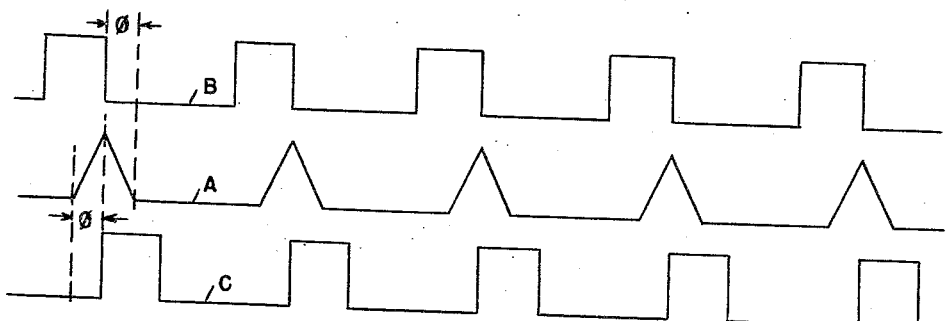
Fig. 2 is a showing of waveforms to aid in understanding the invention.

A pulsed signal generator 25 is connected to the control grids 16 of tubes 10 and 12. The output signal of generator 25 may appear, for example, as the waveform A shown in Fig. 2. To the suppressor grid 18 of tube 10 is connected a reference signal generator 27 which produces a pulsed square wave signal having a repetition rate equal to that of waveform A. The square wave signal is illustrated as waveform B in Fig. 2. Note that each square wave pulse of waveform B leads a corresponding pulse of waveform A by time elapse $\phi$ so that the leading half of the pulses of waveform A coincide with trailing half of those of waveform B. The output of pulse generator 27 is also connected through a delay line 29 to the suppressor grid 18 of tube 12. The pulses passing through delay line 29 (waveform C) also have a repetition rate equal to that of waveform A, but lag the pulses of waveform A by time elapse $\phi$. Therefore, the trailing half of the pulses of waveform A coincide with the leading half of those of waveform C. Due to the effect of bias resistors 20 and 22, tubes 10 and 12 will be cut off in the absence of partial or complete coincidence of the pulses on the suppressor grids (waveforms B and C) with those on the control grids (waveform A). When there is an equal degree of coincidence in both of tubes 10 and 12, as illustrated in Fig. 2, each tube will conduct an equal amount.

Included in the plate circuit of tube 10 are the primary windings of a pair of transformers 28 and 30. Likewise, the primary windings of transformers 32 and 34 are included in the plate circuit of tube 12. When tubes 10 and 12 conduct, the instantaneous polarities of the primary and secondary windings of the respective transformers are as indicated. The negative terminal of the secondary of transformer 30 is connected to ground at point 36 through the parallel combination of resistor 38 and capacitor 39, and the positive terminal of the secondary of transformer 30 is connected to the anode of a diode rectifier 40. The cathode of rectifier 40 is connected to one side of capacitor 42, the other side of which is grounded at point 43. Connected in parallel with the closed circuit just described is a second closed circuit which leads from ground point 44 through the parallel combination of resistor 46 and capacitor 47, the secondary winding of transformer 32, diode 46 and capacitor 42 to ground point 43. It can thus be seen that when tube 10 conducts, diode 40 will conduct also and capacitor 42 will be charged with the polarity shown.

If tube 12 conducts, the opposite effect will be produced. That is, diode 46 will now conduct, but capacitor 42 will be charged with a polarity opposite to that indicated in the drawing.

A similar set of parallel circuits is provided for a second capacitor 48. One of these circuits leads from ground point 44 through resistor 46 and capacitor 47, the secondary of transformer 28, diode 50, and capacitor 48 to ground point 52. The other parallel circuit leads from ground point 36 through resistor 38 and capacitor 39, the secondary of transformer 34, diode 54, and capacitor 48 to ground point 52. When tube 10 conducts, capacitor 58 will be charged to assume the polarity shown. Note that this polarity is opposite to that produced on capacitor 42 when tube 10 conducts. Conduction in tube 12, on the other hand, will charge capacitor 48 in a sense opposite to that shown via transformer 34 and diode 54. The effect of conduction in tube 10, therefore, will be to charge capacitors 42 and 48 with the polarities shown. Conduction in tube 12 will charge the capacitors in a sense opposite to that shown in accordance with the description of the operation of the circuit given above.

A source of negative bias voltage, not shown, is applied to the anodes of diodes 40 and 54 through resistor 56; and a source of positive bias voltage, not shown, is applied to the cathodes of diodes 50 and 46 through resistor 58. It becomes apparent, therefore, that the diodes will not conduct until the voltages produced by the respective transformers overcome the bias voltages.

The voltages appearing at output terminals 60 and 62 will be a pair of proportional opposed polarity voltages whose maximum magnitude is equal to the bias placed on the diodes. The charging circuits for capacitors 42 and 48 are so arranged that they act in opposition. That is, coincidence of a pulse of waveform A with a pulse of waveform B will initiate conduction in tube 10 and will charge capacitor 42 positive while charging capacitor 48 negative. Coincidence and conduction in tube 12 will produce the opposite effect. With equal coincidence in tubes 10 and 12, the voltage on the two capacitors 42, 48 will remain the same. This will be the existing condition when the waveforms assume the phase relationships shown in Fig. 2. If the pulses of waveform A should shift to the left with respect to the pulses of waveforms B and C, a greater coincidence will exist in tube 10 than in tube 12. Therefore, capacitors 42 and 48 will be charged with the polarities shown in the drawing. A shift to the right of waveform A with respect to waveforms B and C will initiate conduction in tube 12 to produce the opposite effect.

It should be noted that once the capacitors 42, 48 are charged, their discharge is blocked by a diode in one of the parallel charging circuits and by a source of bias voltage applied to the other parallel charging circuit. For example, discharge of capacitor 42 will be blocked by diode 40 and the source of positive voltage applied through resistor 58. Hence, no discharge path exists for the capacitors 42 and 48 in the absence of conduction in tube 10 or 12; and, therefore, any voltage placed on these capacitors during conduction in one of tubes 10, 12 will remain on them until one of the tubes again conducts.

Our invention, therefore, provides a means for producing a pair of stable opposed polarity control voltages which vary as a function of the phase shift of a pulsed signal with respect to a pair of reference signals. Although we have described our invention in connection with only one embodiment, it will be understood by those skilled in the art that various changes in form and arrangement of parts can be made to suit requirements without departing from the spirit and scope of the invention. In this respect, it is apparent that the waveforms B and C can be made to shift to the right or left, rather than waveform A, to initiate conduction in tube 10 or 12 and charge capacitors 42 and 48 with proportional, opposing polarities. Likewise it is apparent that the pulses of waveforms B and C need not coincide with one half of the pulses of waveform A under normal conditions when no phase shift occurs. It is only necessary that the coincidence between waveforms A and B be equal to the coincidence between waveforms A and C under normal conditions.

We claim as our invention:

1. A circuit for producing a pair of proportional opposed-polarity voltages comprising first and second electron discharge tubes, an anode, a cathode and at least two grids for each of said tubes, a first source of repetitive voltage pulses, means for applying said first source of voltage pulses to one of the grids in each of said tubes, a second source of repetitive voltage pulses which lead said first source of pulses by a predetermined amount, a third source of repetitive voltage pulses which lag said first source of pulses by said predetermined amount, means for applying said second and third voltage pulses to the other grid of said first and second discharge tubes respectively, each of said tubes being biased so as to conduct only when a voltage pulse on said one grid coincides with a voltage pulse on said other grid, a pair of capacitors, a pair of parallel circuits associated with each of said capacitors, one of the parallel circuits associated with each capacitor being inductively coupled to the plate circuit of the first of said discharge tubes in a manner such that conduction in said first tube will tend to charge said capacitors with opposite polarities, the other of the parallel circuits associated with each capacitor being inductively coupled to the plate circuit of the second of said discharge tubes in a manner such that conduction in said second tube will tend to charge said capacitors with opposite polarities which are reversed with respect to the polarities produced by conduction in said one tube, and means included in each of said parallel circuits for preventing discharge of said capacitors in the absence of conduction in one of said tubes.

2. A circuit for producing a pair of proportional opposed-polarity voltages comprising first and second electron discharge tubes, an anode, a cathode and at least two grids for each of said tubes, a first source of repetitive voltage pulses, means for applying said first source of voltage pulses to one of the grids in each of said tubes, a second source of repetitive voltage pulses which lead said first source of pulses by a predetermined amount, a third source of repetitive voltage pulses which lag said first source of pulses by said predetermined amount, means for applying said second and third voltage pulses to the other grid of said first and second discharge tubes respectively, each of said tubes being biased so as to conduct only upon coincidence of a voltage pulse on said one grid with a voltage pulse on said other grid, a pair of capacitors, a pair of electron paths inductively coupled to the plate circuit of one of said tubes for charging said capacitors with opposite polarities upon conduction in said one tube to thereby obtain said opposed polarity voltages, and a second pair of electron paths inductively coupled to the plate circuit of the other of said tubes for charging said capacitors in opposition to the charge produced by conduction in said one tube.

3. A circuit for producing a pair of proportional opposed-polarity voltages comprising first and second electron discharge tubes, an anode, a cathode and at least two grids for each of said tubes, a first source of repetitive voltage pulses, means for applying said first source of voltage pulses to one of the grids in each of said tubes, a second source of repetitive voltage pulses, a third source of repetitive voltage pulses, means for applying said second and third voltage pulses to the other grid of said first and second discharge tubes respectively, each of said tubes being such as to conduct only upon coincidence of a voltage pulse on said one grid with a voltage pulse on said other grid, an output circuit for each of said discharge tubes, a pair of capacitors, two parallel charging paths for each of said capacitors, inductive means coupling one of said output circuits to one of the two charging paths for each capacitor, and further inductive means coupling the other of said output circuits to the other of the two charging paths for each capacitor.

4. A system for charging a pair of capacitors with proportional opposing polarities comprising a pair of unidirectional conductive paths, a pair of parallel charging circuits associated with each of said capacitors, one of the parallel circuits associated with each capacitor being inductively coupled to a first of said conductive paths in a manner such that conduction in said first path will tend to charge said capacitors with opposite polarities, and the other of the parallel circuits associated with each capacitor being inductively coupled to the second of said paths in a manner such that conduction in said second path will tend to charge said capacitors in opposition to the charge produced by conduction in said one path.

5. The combination claimed in claim 4, wherein means are included in each of said charging circuits for permitting current flow in only one direction to thereby prevent discharge of said capacitors in the absence of current flow in one of said conductive paths.

6. The combination claimed in claim 4 wherein a unidirectional current device is included in each of said charging circuits to prevent discharge of said capacitors in the absence of current flow in one of said conductive paths, and wherein means are included for preventing the charge on said capacitors from exceeding a certain maximum value.

7. A system for charging a pair of capacitors with proportional opposing polarities comprising a first pair of separate charging paths connected in parallel between the opposite terminals of one of said capacitors, a second pair of separate charging paths connected in parallel between the opposite terminals of the other of said capacitors, inductive means included in one of the charging paths for each capacitor for inducing current flow in the said one path associated with each capacitor to charge the capacitors with opposing polarities, and inductive means included in the other of the charging paths for each capacitor for inducing current flow in the said other path associated with each capacitor to thereby reverse the charge placed on the capacitor by said first-mentioned inductive means.

8. A system for charging a pair of capacitors with proportional opposing polarities comprising a pair of parallel charging circuits associated with each of said capacitors, means for inducing current flow in one of the parallel circuits associated with each capacitor to charge the capacitors with proportional opposing polarities, means for inducing current flow in the other of the parallel circuits associated with each capacitor to thereby reverse the charge placed on the capacitors by said first-mentioned means, and a unidirectional current device included in each of said charging paths for preventing discharge of said capacitors in the absence of induced current flow in at least one of the circuits associated with each capacitor.

References Cited in the file of this patent

UNITED STATES PATENTS

| | | |
|---|---|---|
| 2,428,011 | Chatterjea et al. | Sept. 30, 1947 |
| 2,640,151 | Dill et al. | May 26, 1953 |
| 2,682,615 | Sziklai et al. | June 29, 1954 |

FOREIGN PATENTS

| | | |
|---|---|---|
| 326,922 | Great Britain | Mar. 27, 1930 |